US007535847B1

(12) United States Patent
Hansen et al.

(10) Patent No.: US 7,535,847 B1
(45) Date of Patent: May 19, 2009

(54) REMOTE TESTING FOR SERVICE PROVIDER NETWORKS

(75) Inventors: Kevin Harry Hansen, Shawnee, KS (US); Walt Weber, Olathe, KS (US); Mark E. Wendling, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 620 days.

(21) Appl. No.: 11/026,784

(22) Filed: Dec. 30, 2004

(51) Int. Cl.
*H04J 1/16* (2006.01)
*H04J 3/14* (2006.01)
*H04L 12/28* (2006.01)
*H04L 12/56* (2006.01)

(52) U.S. Cl. .................. 370/241; 370/395.53; 370/400; 370/401

(58) Field of Classification Search .................. 370/241, 370/396, 400, 401, 493, 494, 495
See application file for complete search history.

(56) References Cited

U.S. PATENT DOCUMENTS

| 6,363,053 | B1 * | 3/2002 | Schuster et al. ............. 370/230 |
| 7,035,222 | B2 * | 4/2006 | Cahn ........................... 370/241 |
| 2003/0140131 | A1 * | 7/2003 | Chandrashekhar et al. .. 709/223 |
| 2004/0062204 | A1 * | 4/2004 | Bearden et al. .............. 370/250 |
| 2005/0036112 | A1 * | 2/2005 | Sachtler ....................... 351/242 |
| 2005/0147035 | A1 * | 7/2005 | Sylvain et al. ............... 370/230 |
| 2005/0238049 | A1 * | 10/2005 | Delregno ..................... 370/466 |
| 2006/0126495 | A1 * | 6/2006 | Guichard et al. ............. 370/216 |
| 2008/0159155 | A1 * | 7/2008 | Bajpay et al. ............... 370/248 |
| 2008/0232794 | A1 * | 9/2008 | Absillis et al. ................. 398/9 |

* cited by examiner

*Primary Examiner*—Chi H Pham
*Assistant Examiner*—Farah Faroul

(57) ABSTRACT

A method of operating a service provider network comprising selecting a first access network from a plurality of access networks, transmitting first traffic for a first service from a testing system in the service provider network to the first access network over a first virtual connection between the testing system and the first access network wherein the first traffic indicates a first subscriber of the first access network as the origin of the first traffic and the testing system as the destination of the first traffic, receiving second traffic for the first service into the testing system from the first access network over a first service connection wherein the second traffic indicates the first subscriber as the origin of the second traffic and the testing system as the destination of the second traffic, and processing the second traffic to test the first service.

21 Claims, 5 Drawing Sheets

REMOTE TESTING FOR SERVICE PROVIDER NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to remote testing for service provider networks.

2. Description of the Prior Art

Packet-based telecommunication service offerings have gained greater acceptance as telecommunication technologies have advanced. Some examples of service offerings include Voice over Internet Protocol (VoIP) calling, data services, web browsing, and video services, as well as other services. Packet services are often times offered by access providers and provided by service providers. For example, an operator such as a cable company might offer VoIP calling services to its cable customers. However, the services are frequently provided by a service provider other than the cable company.

In such a situation, VoIP call traffic is transported over the cable network to the service provider's network. The traffic can then be transported over the Internet to a destination, or off loaded to another network, such as the public switched telephone network (PSTN). The traffic could also possibly remain on the service provider network depending upon its destination.

It is important that service providers have the ability to test the performance of the various service provided over their customer's access networks. Unfortunately, current service testing methodologies require on-site testing. However, on-site testing is problematic because it requires a technician from the service provider to physically investigate equipment in the customer's network, i.e. a cable network. Further problematically, current testing methodologies lack the ability to remotely test several access networks in a flexible and comprehensive manner. Remote testing capabilities are desired to eliminate the burdens of dispatching technicians and to improve the reliability of telecommunication services.

SUMMARY OF THE INVENTION

An embodiment of the invention helps solve the above problems and other problems by providing methods, systems, and networks that provide remote testing capabilities for service providers to test services on access networks. In particular, an example of the invention allows a service provider to dynamically emulate the experience of a subscriber within an access network from a position outside of the access network. By emulating the subscriber experience at a remote test location, the service provider can locate service problems within an access network without the burdens of dispatching technicians. Furthermore, the ability to emulate the subscriber experience allows a service provider to enforce quality of service standards on the owners and operators of access networks.

In an embodiment of the invention, a communication network comprises a plurality of access networks, a service provider network coupled to the plurality of access networks, and a testing system. The testing system is in the service provider network and is configured to select a first access network from the plurality of access networks, transmit first traffic for a first service to the first access network over a first virtual connection between the testing system and the first access network. The first traffic indicates a first subscriber of the first access network as the origin of the first traffic and the testing system as the destination of the first traffic. The testing system is also configured to receive second traffic for the first service from the first access network over a first service connection wherein the second traffic indicates the first subscriber as the origin of the second traffic and the testing system as the destination of the second traffic. The testing system is also configured to process the second traffic to test the first service.

In another embodiment of the invention, the first access network comprises a cable network.

In another embodiment of the invention, the first access network comprises an Ethernet network.

In another embodiment of the invention, the first virtual connection comprises a Virtual Private Network (VPN) connection.

In another embodiment of the invention, the first service connection comprises a Virtual Private Network (VPN) connection.

In another embodiment of the invention, the testing system is further configured to select a second access network from the plurality of access networks, transmit third traffic for a second service from the testing system in the service provider network to the second access network over a second virtual connection between the testing system and the second access network wherein the third traffic indicates a second subscriber of the second access network as the origin of the third traffic and the testing system as the destination of the third traffic, receive fourth traffic for the second service into the testing system from the second access network over a second service connection wherein the fourth traffic indicates the second subscriber as the origin of the fourth traffic and the testing system as the destination of the fourth traffic, and process the fourth traffic to test the second service.

In another embodiment of the invention, the service provider provides the first service to the first subscriber over the first customer network.

In another embodiment of the invention, the first service comprises Voice over Internet Protocol (VoIP) service.

In an embodiment of the invention, the first VPN connection couples the testing system to the first subscriber side of a soft-switch in the first customer network.

In another embodiment of the invention, transmitting the first traffic comprises originating a call.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
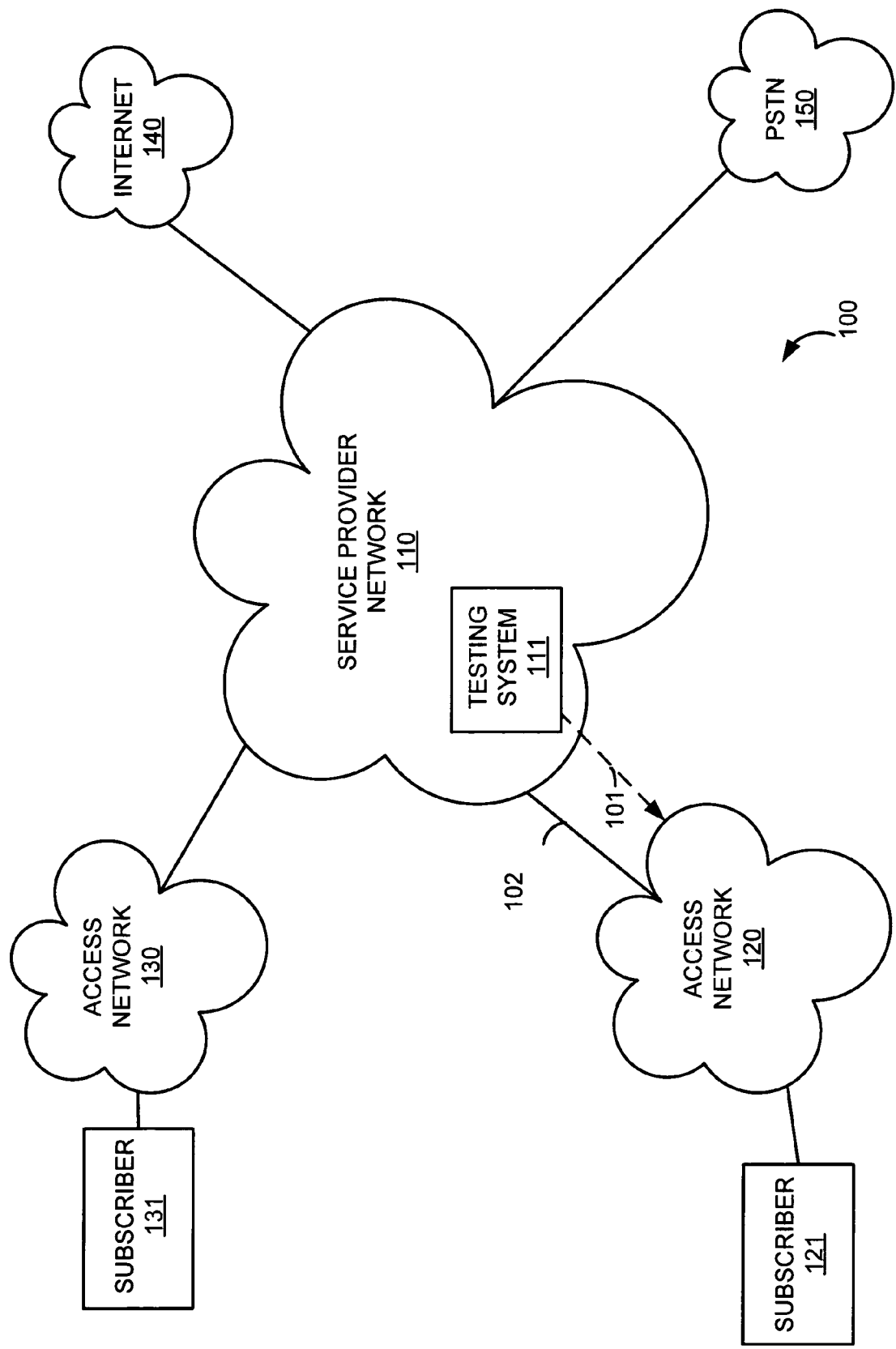
FIG. 1 illustrates a communication network in an embodiment of the invention.
Figure 2:
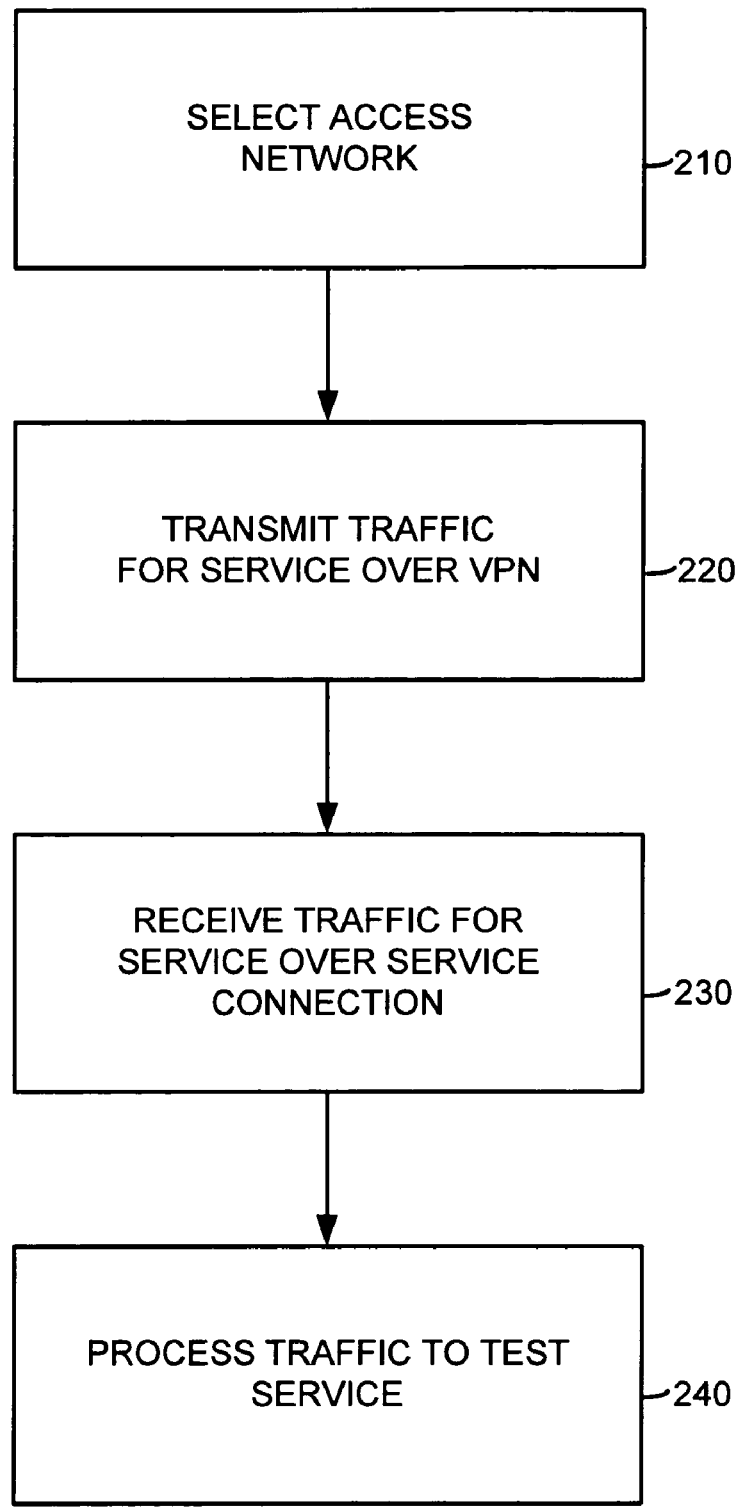
FIG. 2 illustrates the operation of a communication network in an embodiment of the invention.

FIGS. 1 and 2

FIG. 1 illustrates communication network 100 in an embodiment of the invention. Communication network 100 includes service provider network 110, access network 120, access network 130, Internet 140, and PSTN 150. Access network 120 includes subscriber 121. Access network 130 includes subscriber 131. Access networks 120 and 130 could be referred to as customer networks, partner networks, and enterprise networks, as well as other types of networks.

Service provider network 110 provides services to access networks 120 and 130. For example, access networks 120 and 130 could be cable networks that offer services to subscribers 121 and 131 provided by service provider network 110. Access networks 120 and 130 could be Ethernet or fast-Ethernet based networks, as well as other types of packet networks. Subscriber 121 could be a subscriber of multiple services offered through access network 120, such as cable television services, as well as other services. Subscriber 121 could also subscribe to services provided by service provider network 110 but offered by access network 120, such as packet based voice calling services. Subscriber 131 could be a subscriber of multiple services offered through access network 130, such as cable television services, as well as other services. Subscriber 131 could also subscribe to services provided by service provider network 110 but offered by access network 130, such as packet based voice calling services.

Service provider network 110 is in communication with access network 120, access network 130, Internet 140, and PSTN 150 over service connections well known in the art. For example, service provider network 110 is in communication with access network 120 over service connection 102. Service connection 102 could be, for example, a virtual private network (VPN) connection that transports traffic between access network 120 and service provider network 110. When subscriber 121 uses a service provided by service provider network 110, traffic for the service traverses access network 120 and is transported by service connection 102 to service provider network 110.

Service provider network 110 also includes testing system 111. Testing system 111 is in communication with access network 120 by virtual connection 101. Virtual connection 101 provides testing system 111 with subscriber side access to access network 120. Call origination is an example of a test that could be performed by testing system 111 to test the experience of a subscriber placing a packet voice call from within access network 120.

During a call origination test, the elements of access network 120 perceive a call placed by testing system 111 as originating from one of its subscribers. Testing system 111 also has subscriber rights within service provider network 110. Therefore, the test call can be placed directly back to testing system 111 itself. The first leg of the call extends over virtual connection 101, and the second leg of the call extends over service connection 102. The call is routed over various elements of service provider network 110, such as routers, which are not shown for purposes of clarity.

FIG. 2 illustrates the operation of communication network 100 in an embodiment of the invention. In this embodiment, services are provided over access networks 120 and 130 from service provider network 110. It is desirable to test the operation of the services on access networks 120 and 130. To begin testing, one of access networks 120 and 130 is selected for testing (Step 210). Virtual connections to access networks 120 and 130 could be previously provisioned, or the virtual connections can be dynamically setup. In either case, testing occurs over the virtual connection associated with the selected access network and over the incoming service connection, such as service connection 102.

For illustrative purposes, it is assumed in this example that customer network 120 has been selected. Virtual connection 101 therefore extends from testing system 111 to access network 120. Service connection 102 extends back from access network 120 to testing system 111. Traffic for the service under test is transmitted on virtual connection 101 between testing system 111 and access network 120 (Step 220). Traffic flows from test system 111 across virtual connection 101 through access network 120 back to service provider network 110 via service connection 102. The traffic is received by test system 111.

Test system 111 could transmit the traffic with an origin address indicating to access network 120 that test system 111 is a subscriber. The address could also be the address of an actual subscriber used by test system 111. Alternatively, the address could be a generic address reserved for testing purposes by access network 120. Test system 111 is therefore able to emulate the service experience as viewed from the perspective of a subscriber in access network 120 (Step 230). After receiving traffic from access network 120, test system 111 processes the traffic to test the service (Step 240). Some examples of test functions include originating calls from access networks, terminating calls on access networks, testing call features such as 3-way calling and emergency services, trunk routing verification, and analog performance measurements Optionally, multiple access networks can be dynamically tested. For example, access network 130 can be selected for testing. As with access network 120, a virtual connection and a service connection extend between access network 130 and service provider network 110. Traffic is transmitted from testing system 111 to access network 130 over the virtual connections, and traffic is received from access network 130 over the service connection. The traffic indicates a subscriber as the origin of the traffic and testing system 111 as the destination of the first traffic. Traffic for the service is received into testing system 111 over the service connection from access network 130 indicating a subscriber as the origin of the traffic and testing system 111 as the destination of the traffic. Lastly, the traffic received into testing system 111 is processed to test the service.

In another embodiment, testing system 111 can simultaneously connect to both access network 120 and 130 and test multiple services provided over both networks. It is important to maintain a secure environment in testing system 111 separating the subscriber experience in access network 120 and 130. By utilizing separate VPNs to reach each access network, it is possible to keep service traffic from access network 120 distinct from traffic received from access network 130.

Advantageously, communication network 100 allows for selectively connecting to multiple access networks via specific virtual connections to test the service performance of an access network from within a service provider network. Such an advantage is desired to eliminate the requirement for installing local test equipment and dispatching technicians. Additionally, communication network 100 allows for dynamically selecting one of several customer networks to test. Further advantageously, remote service testing allows the service provider to isolate network problems and determine whether problems exist in the customer networks or the service provider network without having to assess problems locally.

Second Embodiment Configuration and Operation

Figure 3:
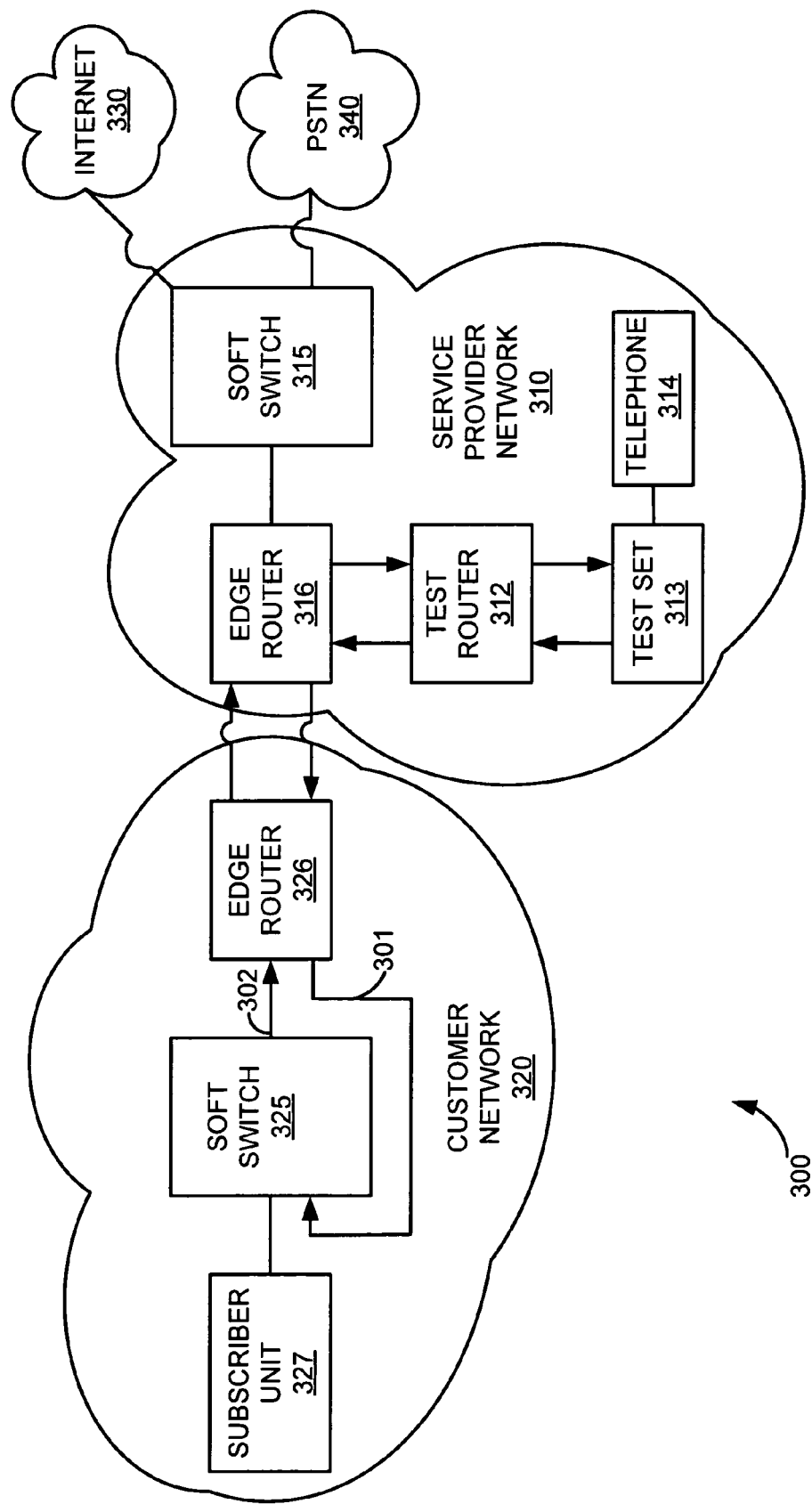
FIG. 3 illustrates a communication network in an embodiment of the invention.
Figure 4:
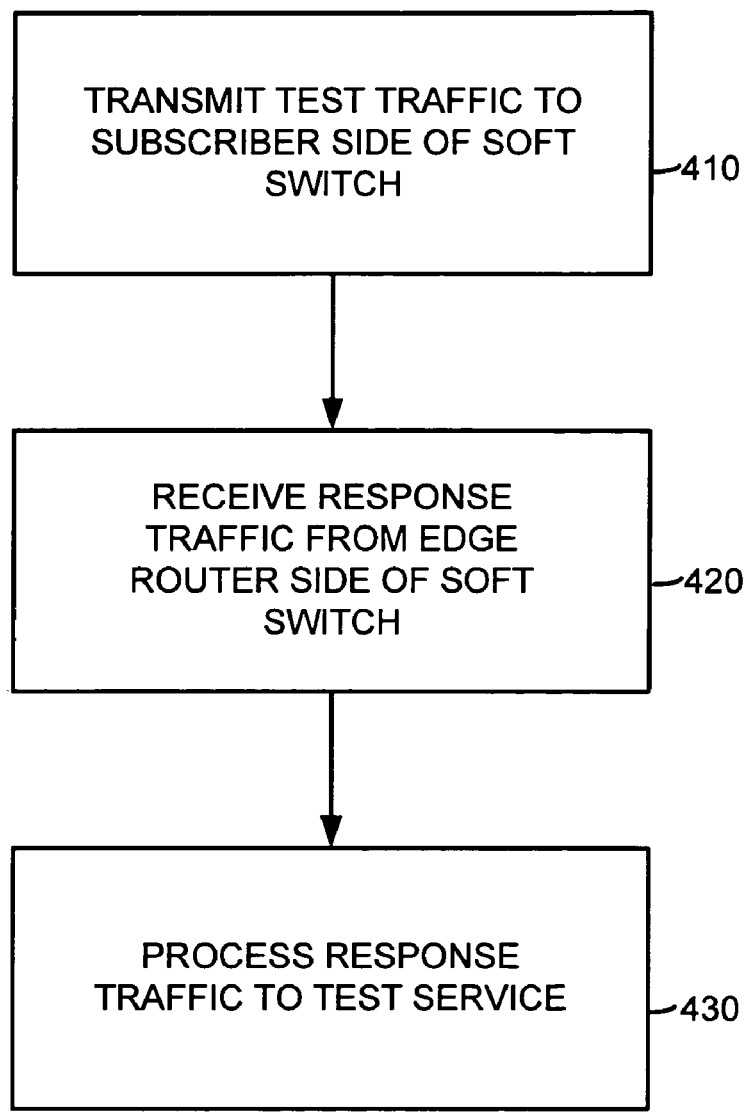
FIG. 4 illustrates the operation of a communication network in an embodiment of the invention.

FIGS. 3 and 4

FIG. 3 illustrates communication network 300 in an embodiment of the invention. Communication network 300 includes service provider network 310, customer network 320, Internet 330, and PSTN 340. Service provider network 310 includes soft switch 315, edge router 316, test router 312, test set 313, and telephone 314. Test set 313 could also be referred to as a test device. Customer network 320 includes soft switch 325, subscriber unit 327, and edge router 326. Service connection 302 and virtual private network (VPN) connection 301 extend between test set 313 and soft switch 325 through edge router 326, edge router 316, and test router 312.

In this embodiment, customer network 310 is an access network operated by a customer of service provider network 310. Customer network 310 could be, for example, a broadband cable network, as well as other types of access networks. Services are offered over customer network 320 to subscribers on customer network 320. Examples of services include packet voice service, data service, Internet services, web browsing, and video services, as well as other services. For illustrative purposes, the following description discusses packet voice services.

Further in this embodiment, a user at subscriber unit 327 accesses the services of service provider network 310 over customer network 320. During a packet voice call, packet voice communications are routed to soft switch 325, and then over service connection 302 to service provider network 310. Service provider network 310 then transports the communications to Internet 330 or PSTN 340 to various destinations. The destinations could also be on service provider network 310. At some point, it may become desirable for operators at service provider network 310 to test their services on customer network 320.

The ability to test packet voice service on customer network 320 and measure its performance and quality is accomplished by connecting test set 313 to customer network 320 using VPN 301 and service connection 302. Specifically, VPN 301 connects a port on test set 313 to a subscriber side port on soft switch 325. Service connection 302 is a standard service connection that would be utilized to terminate any call to telephone 314, assuming telephone 314 has subscriber rights in service provider network 310. Service connection 302 therefore extends from the edge router side of soft switch 325.

VPN 301 is in the address space of the customer's subscriber phones. Thus, test set 313 is provided an input to soft switch 325 to mimic a subscriber unit, such as subscriber unit 327. Test set 313, in conjunction with telephone 314, is also connected via service connection 302 to customer network 320. A user can then utilize telephone 314 connected to test set 313 to test the service performance of customer network 320.

FIG. 4 illustrates the operation of communication network 300 in an embodiment of the invention. It is assumed in this embodiment that packet voice service, such as VoIP, is the service under test. To begin, test traffic is transmitted over VPN 301 to the subscriber side of soft switch 325 (Step 410). VPN 301 provides logical connectivity from test set 313 to soft switch 325. The test traffic comprises packets indicating an origin and a destination. In this case, the test traffic indicates subscriber unit 327 as its origin and soft switch 325 as its destination.

Depending upon the test being performed, soft switch 325 should respond accordingly. In this example, test set 313 emulates a subscriber on customer network 320. Test set 313 also has subscriber rights in service provider network 310. Therefore, a call origination test could indicate the address or phone number for test set 313 in service provider network 310. In this example, service connection 302 is utilized to direct the response traffic back to test set 313 (Step 420). The response traffic can be processed at test set 313 or telephone 314 to test the performance of soft switch 325 for packet based voice traffic (Step 430). Response traffic that does not include information in accordance with the proper operation of soft switch 325 for the service indicates that soft switch 325 is operating incorrectly. Similarly, response traffic that includes the proper information indicates the soft switch 325 is operating correctly. There could be no response traffic at all of soft switch 325 is unable to terminate the test call.

In another example, the test could be a call origination back to a destination on the PSTN. The test traffic would indicate a desired destination for the call in some form, such as a PSTN phone number. A typical call from subscriber unit 327 would be routed through edge routers 326 and 316 to soft switch 315. Soft switch 315 could include a media gateway and would route the call to PSTN 340. Under test, soft switch 325 should process the test traffic and develop an appropriate response similar to a typical call flow. In the case of testing call origination, soft switch 325 should respond by sending response traffic to soft switch 315 in service provider network 310.

The particular location for the test number could be known to the operators performing the test. For example, the test number could be a test port on a PSTN switch. An operator could access the test port on the PSTN switch with test equipment. A successful call termination would result in a call from telephone 314 to the test equipment on the PSTN switch. In this manner, various dialing plans can be tested by test set 313 to determine of soft switch 325 processes the plans properly. In another example, the test number could be a SIP address on Internet 330. In such an example, both soft switch 325 and soft switch 315 would be required to interact effectively to terminate the test call to a SIP device for the test number on Internet 330. Test set 313 could also be configured to represent both telephone 314 and a mobile packet based voice communication device.

VPN 301 and service connection 302 could comprise VPNs that are well known in the art. Multiple different types of VPN service are possible. Test router 312 can be re-programmed to broadcast a new address. For example, several VPNs could be created extending from test router to several customer networks. A test interface between test set 313 and test router 312 allows for selecting a customer network by re-programming test router 312. The test process for other customer networks operates in accordance with the process described above for customer network 320.

In another embodiment of the invention, service providers can test cable modem termination systems (CMTS) in customer networks. A customer network could include many CMTS units that require testing. A single CMTS unit resides between subscribers and soft switches in the network. In this embodiment, VPN 301 would extend between test set 313 and the subscriber side of the CMTS. Service connection 302 would extend between test set 313 and the soft switch side of the CMTS. Often times there are hundreds of CMTS units in a customer network. By utilizing remote testing, service providers are able to test the hundreds of CMTS units without dispatching technicians.

Computer System

Figure 5:
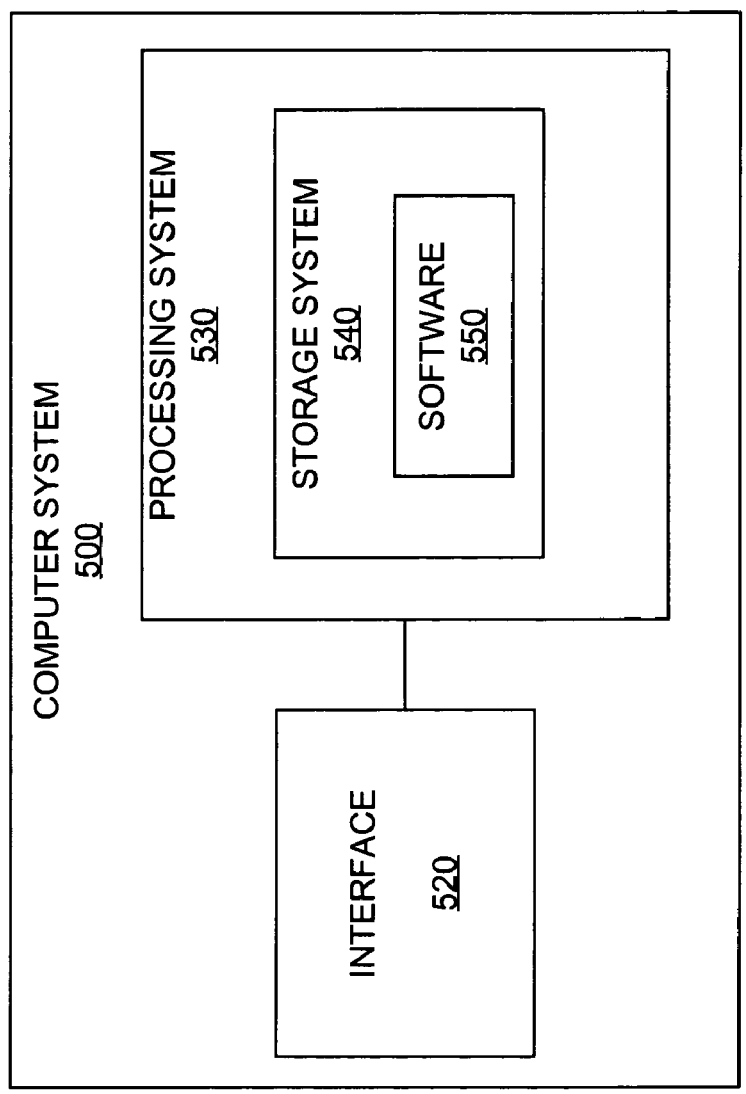
FIG. 5 illustrates a computer system in an embodiment of the invention.

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for testing system 111 and test set 313.

What is claimed is:

1. A method of operating a service provider network, the method comprising:
    selecting a first access network from a plurality of access networks;
    transmitting first traffic for a first service from a testing system in the service provider network to the first access network over a first virtual connection between the testing system and the first access network wherein the first traffic indicates a first subscriber of the first access network as the origin of the first traffic and the testing system as the destination of the first traffic;
    receiving second traffic for the first service into the testing system from the first access network over a first service connection wherein the second traffic indicates the first subscriber as the origin of the second traffic and the testing system as the destination of the second traffic; and
    processing the second traffic to test the first service.

2. The method of claim 1 wherein the first access network comprises a cable network.

3. The method of claim 1 wherein the first access network comprises an Ethernet network.

4. The method of claim 1 wherein the first virtual connection comprises a Virtual Private Network (VPN) connection.

5. The method of claim 1 wherein the first service connection comprises a Virtual Private Network (VPN) connection.

6. The method of claim 1 further comprising:
    selecting a second access network from the plurality of access networks;
    transmitting third traffic for a second service from the testing system in the service provider network to the second access network over a second virtual connection between the testing system and the second access network wherein the third traffic indicates a second subscriber of the second access network as the origin of the third traffic and the testing system as the destination of the third traffic;
    receiving fourth traffic for the second service into the testing system from the second access network over a second service connection wherein the fourth traffic indicates the second subscriber as the origin of the fourth traffic and the testing system as the destination of the fourth traffic; and
    processing the fourth traffic to test the second service.

7. The method of claim 1 wherein the service provider provides the first service to the first subscriber over the first access network.

8. The method of claim 1 wherein the first service comprises Voice over Internet Protocol (VoIP) service.

9. The method of claim 1 wherein the first virtual connection couples the testing system to the first subscriber side of a soft-switch in the first access network.

10. The method of claim 1 wherein transmitting the first traffic comprises originating a call.

11. A communication network comprising:
    a plurality of access networks;
    a service provider network coupled to the plurality of access networks; and
    a testing system in the service provider network that selects a first access network from the plurality of access networks, transmits first traffic for a first service to the first access network over a first virtual connection between the testing system and the first access network wherein the first traffic indicates a first subscriber of the first access network as the origin of the first traffic and the testing system as the destination of the first traffic, receives second traffic for the first service into the testing system from the first access network over a first service connection wherein the second traffic indicates the first subscriber as the origin of the second traffic and the testing system as the destination of the second traffic, and processes the second traffic to test the first service.

12. The communication network of claim 11 wherein the first access network comprises a cable network.

13. The communication network of claim 11 wherein the first access network comprises an Ethernet network.

14. The communication network of claim 11 wherein the first virtual connection comprises a Virtual Private Network (VPN) connection.

15. The communication network of claim 11 wherein the first service connection comprises a Virtual Private Network (VPN) connection.

16. The communication network of claim 11 wherein the testing system selects a second access network from the plurality of access networks, transmits third traffic for a second service from the testing system in the service provider network to the second access network over a second virtual connection between the testing system and the second access network wherein the third traffic indicates a second subscriber of the second access network as the origin of the third traffic and the testing system as the destination of the third traffic, receives fourth traffic for the second service into the testing system from the second access network over a second service connection wherein the fourth traffic indicates the second subscriber as the origin of the fourth traffic and the testing system as the destination of the fourth traffic, and processes the fourth traffic to test the second service.

17. The communication network of claim 11 wherein the service provider provides the first service to the first subscriber over the first customer network.

18. The communication network of claim 11 wherein the first service comprises Voice over Internet Protocol (VoIP) service.

19. The communication network of claim 11 wherein the first VPN connection couples the testing system to the first subscriber side of a soft-switch in the first customer network.

20. The communication network of claim 11 wherein transmitting the first traffic comprises originating a call.

21. A testing system comprising:
a processing system that selects a first access network from a plurality of access networks coupled to a service provider network;
an interface that transmits first traffic for a first service to the first access network over a first virtual connection between the testing system and the first access network wherein the first traffic indicates a first subscriber of the first access network as the origin of the first traffic and the testing system as the destination of the first traffic, receives second traffic for the first service into the testing system from the first customer network over a first service connection wherein the second traffic indicates the first subscriber as the origin of the second traffic and the testing system as the destination of the second traffic; and
the processing system that further processes the second traffic to test the first service.

\* \* \* \* \*